(12) United States Patent
Saji et al.

(10) Patent No.: US 9,065,539 B2
(45) Date of Patent: Jun. 23, 2015

(54) CIRCUIT MODULE

(71) Applicant: TAIYO YUDEN CO., LTD., Tokyo (JP)

(72) Inventors: Tetsuo Saji, Tokyo (JP); Hiroshi Nakamura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/275,788

(22) Filed: May 12, 2014

(65) Prior Publication Data

US 2015/0119104 A1   Apr. 30, 2015

(30) Foreign Application Priority Data

Oct. 30, 2013   (JP) ................................ 2013-225219

(51) Int. Cl.
   H04M 1/00        (2006.01)
   H04B 1/40        (2015.01)
   H04W 88/10       (2009.01)

(52) U.S. Cl.
   CPC ........ *H04B 1/40* (2013.01); *H04W 88/10* (2013.01)

(58) Field of Classification Search
   USPC ............... 455/552.1, 553.1, 90.3, 570, 333
   See application file for complete search history.

(56) References Cited

U.S. PATENT DOCUMENTS

| 7,373,171 | B2 * | 5/2008 | Nakai ......................... 455/552.1 |
| 7,515,879 | B2 * | 4/2009 | Okabe et al. .................... 455/73 |
| 8,391,821 | B2 * | 3/2013 | Okabe ........................... 455/323 |
| 8,405,546 | B1 * | 3/2013 | Yeh et al. .................. 342/357.73 |
| 8,849,362 | B1 * | 9/2014 | Saji et al. ................... 455/575.1 |
| 2004/0116089 | A1 * | 6/2004 | Lee et al. ....................... 455/140 |
| 2005/0104685 | A1 * | 5/2005 | Kuroki et al. ................. 333/133 |
| 2005/0119025 | A1 * | 6/2005 | Mohindra et al. ......... 455/552.1 |
| 2005/0281210 | A1 * | 12/2005 | Makino ......................... 370/275 |
| 2006/0063493 | A1 * | 3/2006 | Yanduru et al. ................. 455/77 |
| 2006/0186755 | A1 * | 8/2006 | Mori et al. ................. 310/313 R |
| 2007/0058748 | A1 * | 3/2007 | Kim et al. ..................... 375/295 |
| 2008/0111226 | A1 * | 5/2008 | White et al. .................. 257/686 |
| 2008/0261650 | A1 * | 10/2008 | Piriyapoksombut et al. ......................... 455/552.1 |
| 2009/0093270 | A1 * | 4/2009 | Block et al. ................. 455/552.1 |
| 2010/0304770 | A1 * | 12/2010 | Wietfeldt et al. ............ 455/509 |
| 2011/0026458 | A1 * | 2/2011 | Gruber et al. ................. 370/328 |
| 2013/0120658 | A1 * | 5/2013 | Petruzzelli .................... 348/659 |
| 2013/0154868 | A1 * | 6/2013 | Kehrer et al. ................... 342/16 |
| 2014/0051371 | A1 * | 2/2014 | Saji et al. ........................ 455/78 |
| 2014/0062607 | A1 * | 3/2014 | Nair et al. ....................... 331/68 |

FOREIGN PATENT DOCUMENTS

JP         2005-277939 A      10/2005

\* cited by examiner

*Primary Examiner* — Edward Urban
*Assistant Examiner* — Rui Hu
(74) *Attorney, Agent, or Firm* — Chen Yoshimura LLP

(57) ABSTRACT

A circuit module includes: an RFIC that has a transceiver circuit for processing high-frequency signals related to mobile phone communication and a reception circuit for processing reception signals related to GPS, which is a satellite positioning system; GPS front end components; and mobile phone front end components. The mobile phone front end components are mounted on one main surface of a circuit substrate, and at least one of the GPS front end components (a second band-pass filter) is embedded in the circuit substrate.

8 Claims, 3 Drawing Sheets

CIRCUIT MODULE

FIELD OF THE INVENTION

The present invention relates to a circuit module having a high-frequency circuit, baseband circuit, and the like mounted together on a circuit substrate, and particularly relates to a mounting structure for front end components that process reception signals related to a satellite positioning system such as GPS (global positioning system).

DESCRIPTION OF RELATED ART

Recently, as shown by multi-functional mobile phones such as the smartphone, the functions of mobile phones are increasing while their size is decreasing. Known examples of such a mobile phone include a mobile phone in which a high-frequency circuit module that has various types of front end components necessary for transmission and reception of high-frequency signals mounted together on a circuit substrate is mounted on a motherboard (see Patent Document 1, for example). The term "front end components" means active or passive components for high-frequency signal processing that are arranged on a path between the high-frequency IC, which processes high-frequency signals, and the antenna. In a high-frequency circuit module disclosed in Patent Document 1, front end components such as a power amplifier IC, transmission filters, and reception filters are mounted on a circuit substrate. Passive components such as a capacitor forming a matching circuit are also embedded in the circuit substrate. The high-frequency circuit module in Patent Document 1 includes two transceiver systems, the digital cellular system operating in the 800 MHz band and the PCS (personal communication services) system operating in the 1.9 GHz band, and one reception system operating in the 1.5 GHz band for reception of GPS (global positioning system) signals in order to use positioning functions by the GPS.

RELATED ART DOCUMENT

Patent Document

Patent Document 1: Japanese Patent Application Laid-Open Publication No. 2005-277939

SUMMARY OF THE INVENTION

In the high-frequency circuit module disclosed in Patent Document 1, only the front end components are mounted together; however, in order to achieve a further increase in mounting density and functionality, demand has recently emerged to have not only the front end components but almost all of the functions of a mobile phone, such as the high-frequency IC, power circuit, baseband signal processing circuit, and memory mounted on a single module. However, merely adopting the configuration in Patent Document 1 as a method to mount the front end components together sometimes causes the receiver sensitivity to GPS reception signals to degrade. This degradation in receiver sensitivity to GPS reception signals occurs due to GPS reception signals having a much lower signal level than high-frequency signals related to mobile phone communication, which causes leaked high-frequency signals related to mobile phone communication to electromagnetically couple with the front end components for GPS reception signals.

The present invention was made in view of the above conditions and aims at providing a circuit module that is small with a high mounting density and that can prevent degradation in receiver sensitivity to a satellite positioning system caused by leakage of high-frequency signals related to mobile phone communication.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, a circuit module according to the present invention includes: a circuit substrate formed by stacking conductive layers and insulating layers; a high-frequency integrated circuit that has a reception circuit and a transceiver circuit that are mounted on a main surface of the circuit substrate, the reception circuit processing reception signals for a satellite positioning system and the transceiver circuit processing high-frequency signals for mobile phone communication; one or more front end components for the satellite positioning system arranged on a path of the reception signals between a satellite positioning system antenna and the high-frequency integrated circuit; and one or more front end components for a mobile phone arranged on a path of the high-frequency signals between a mobile phone communication antenna and the high-frequency integrated circuit, wherein at least one of the front end components for the mobile phone is mounted on the main surface of the circuit substrate, and wherein at least one of the front end components for the satellite positioning system is embedded in the circuit substrate.

According to the present invention, the reception circuit for the satellite positioning system and the transceiver circuit for mobile phone communication are integrated in the high-frequency IC; therefore, the circuit module is small and has a high mounting density. Furthermore, according to the present invention, the front end components for mobile phone communication are mounted on the circuit substrate, and a front end component for the satellite positioning system is embedded in the circuit substrate; thus, leakage of high-frequency signals related to mobile phone communication can be prevented from electromagnetically coupling with the satellite positioning system front end components. This can prevent degradation in receiver sensitivity of the satellite positioning system.

A filter that allows reception signals of the satellite positioning system to pass through and an amplifier that amplifies reception signals of the satellite positioning system are included as examples of the satellite positioning system front end components. In an example of one preferred aspect of the present invention, a distance between the filter and the amplifier is greater than a distance between the filter and the mobile phone front end components and greater than a distance between the filter and the high-frequency integrated circuit. In another example of one preferred aspect of the present invention, a baseband processing part that processes baseband signals is mounted between the filter and the amplifier. In these aspects of the present invention, the amplifier for the satellite positioning system can be placed at a sufficient distance from the mobile phone front end components; therefore, leakage of high-frequency signals related to mobile phone communication can be prevented from electromagnetically coupling with the amplifier.

In another example of one preferred aspect of the present invention, the circuit substrate includes a core layer that is a conductive layer thicker than the other conductive layers and that functions as ground, and the embedded satellite positioning system front end component is arranged in a recessed portion or a penetrating hole formed in the core layer. According to the present invention, the core layer that functions as ground can more effectively reduce leaked high-frequency signals related to mobile phone communication from electromagnetically coupling with the satellite positioning system front end components.

According to the present invention, the reception circuit for the satellite positioning system and the transceiver circuit for mobile phone communication are integrated in the high-frequency IC; therefore, the circuit module is small and has a high mounting density. Furthermore, according to the present invention, the front end components for mobile phone communication are mounted on the circuit substrate, and the front end components for the satellite positioning system are embedded in the circuit substrate; thus, leakage of high-frequency signals related to mobile phone communication can be prevented from electromagnetically coupling with the satellite positioning system front end components. This can prevent degradation in receiver sensitivity to the satellite positioning system.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Figure 1:
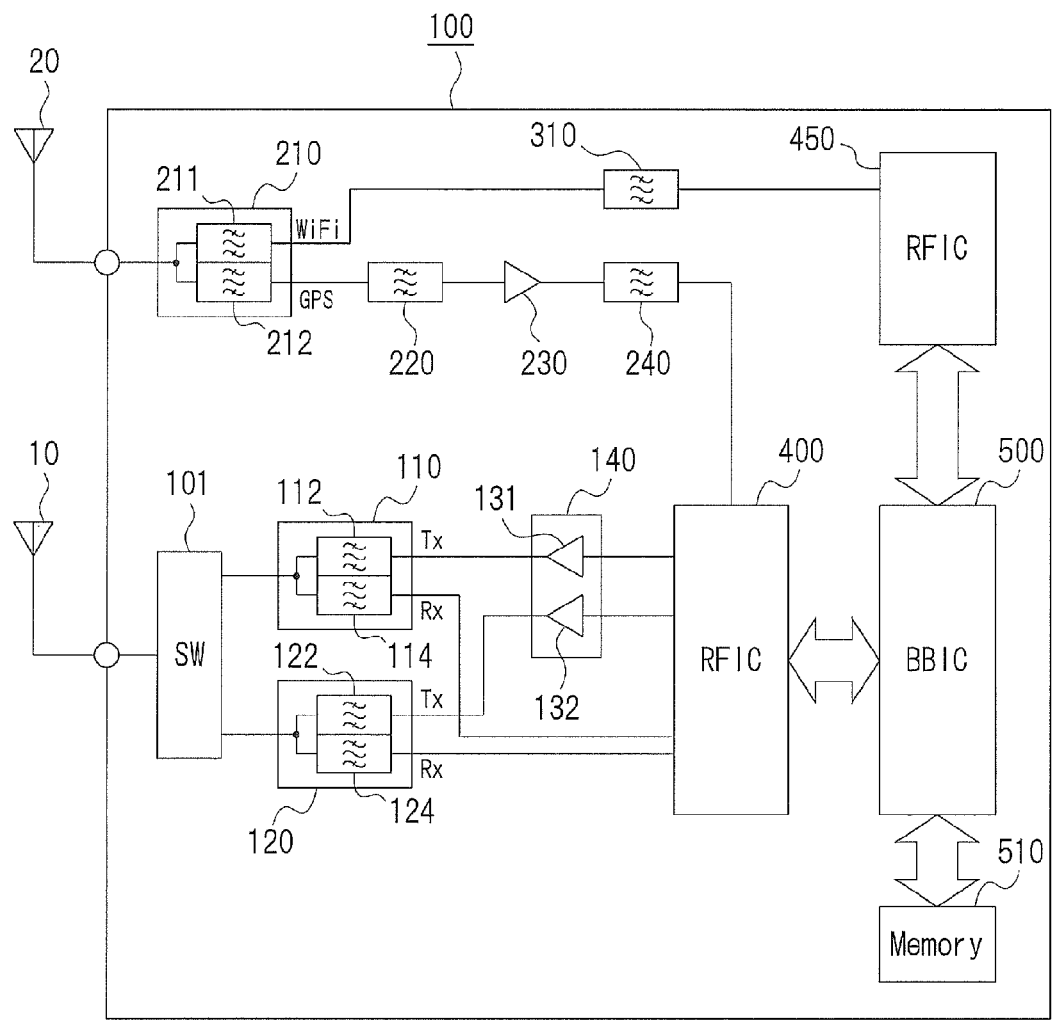
FIG. 1 is a schematic circuit diagram of a circuit module.

A circuit module according to an embodiment of the present invention will be explained with reference to figures. FIG. 1 is a schematic block view of the circuit module. In the present embodiment, for ease of explanation, main configurations relating to the gist of the present invention will be explained.

A circuit module 100 of the present embodiment has the primary functions of the multi-functional mobile phone, the smartphone, integrated into a single module. Specifically, the circuit module 100 is provided with various functions such as voice communication on the mobile phone network, which is a broadband wireless communication network, WiFi (registered trademark), which is a form of short-range wireless communication, Bluetooth (registered trademark), and GPS (global positioning system), which is a satellite positioning system. For ease of explanation, the circuit module 100 of the present embodiment is assumed to operate on a mobile phone network with two frequency bands.

As shown in FIG. 1, the circuit module 100 includes a high-frequency switch 101, first and second duplexers 110 and 120, and high-frequency power amplifiers 131 and 132 as front end components for mobile phone communication. The circuit module 100 also has a diplexer 210, a first band-pass filter 220, a low-noise amplifier 230, and a second band-pass filter 240 as GPS front end components. A third band-pass filter 310 is provided as a WiFi front end component. As shown in FIG. 1, the diplexer 210 is also a front end component for WiFi and Bluetooth functionality.

The circuit module 100 also includes an RFIC 400 that has a reception circuit and transmission circuit for high-frequency signals and that performs modulation and demodulation of the high-frequency signals and the like. One feature of the present invention is that the RFIC 400 performs GPS reception signal processing in addition to the processing of high-frequency signals related to mobile phone communication. The circuit module 100 also includes an RFIC (radio frequency integrated circuit) 450 for WiFi communication. The circuit module 100 further includes a memory 510, and a baseband IC 500, which is the central processing unit responsible for processing functions (so-called baseband functions) of digital signals related to the respective communications and various types of application functions (such as camera control and imaging data processing) for the mobile phone.

The actual circuit module 100 includes front end components and/or the RFIC (as primary components) for high-frequency signal processing, such as forming a diversity reception circuit or a second transceiver circuit for two-way simultaneous communication. The circuit module 100 also includes a power circuit for supplying power to the RFICs 400 and 450, a clock circuit that serves as a digital processing reference, and the like, but descriptions of these have been omitted from the present application.

The high-frequency switch 101 switches the connection to the external antenna 10 between the first and second duplexer 110 and 120.

The respective duplexers 110 and 120 for the mobile phone network are provided with transmission filters 112 and 122 and reception filters 114 and 124. Various types of acoustic wave filters such as SAW (surface acoustic wave) filters and BAW (bulk acoustic wave) filters can be used for the transmission filters 112 and 122 and the reception filters 114 and 124. In the present embodiment, SAW filters are used for the respective filters. In the present embodiment, the duplexers 110 and 120 use a configuration in which the respective transmission filters 112 and 122 and reception filters 114 and 124 are housed in a single package.

The transmission filters 112 and 122 are respectively connected to the transmission ports of the RFIC 400 via the high-frequency power amplifiers 131 and 132. The reception filters 114 and 124 are respectively connected to the reception ports of the RFIC 400. In the present embodiment, the high-frequency power amplifiers 131 and 132 are integrated into a single package as a power amp IC 140.

As described above, the high frequency circuit module 100 of the present embodiment operates in two frequency bands, and the duplexers 110 and 120 filter high frequency signals so as to allow only signals in a prescribed frequency band to pass through.

Specifically, the first duplexer 110 operates in a 2100 MHz band of W-CDMA (Wideband Code Division Multiple Access) or LTE (Long Term Evolution). Accordingly, the first transmission filter 112 is a band-pass filter operating from 1920 to 1980 MHz, and the first reception filter 114 is a band-pass filter operating from 2110 to 2170 MHz. Meanwhile, the second duplexer 120 operates in a 900 MHz band of W-CDMA and LTE. Accordingly, the second transmission filter 122 is a band-pass filter that operates between 880 and 915 MHz, and the second reception filter 124 is a band-pass filter that operates between 925 and 960 MHz.

The diplexer 210 is a device for branching high-frequency signals transmitted and received by the antenna 20 into GPS reception signals and high-frequency signals related to WiFi communication. This diplexer 210 is provided with a band-pass filter 212 that allows only GPS reception signals to pass through, and a band-pass filter 211 that allows only high-frequency signals related to WiFi communication to pass through. In the present embodiment, the diplexer 210 has a configuration in which the band-pass filters 211 and 212 are housed in a single package. The diplexer 210 may be constituted of a low-pass filter that allows GPS reception signals to pass through but does not allow high-frequency signals related to WiFi communication to pass through, and a high-pass filter that allows high-frequency signals related to WiFi communication to pass through but does not allow GPS reception signals to pass through.

The first band-pass filter 220 and second band-pass filter 240 are each filters for allowing only GPS reception signals to pass through. Various types of filters can be used for the respective band-pass filters 220 and 240, including an acoustic wave filter such as a SAW filter or a BAW filter. In the present embodiment, SAW filters are used for the respective filters. The second band-pass filter 240 is connected to the reception port of the RFIC 400. In the present embodiment, the reason the front end components for GPS adopt the configuration as described above is that GPS reception signals are weak and, as described later, the distance between the terminal for connecting with the antenna 20 and the RFIC 400 is large. Receiver sensitivity is ensured by introducing a low-noise amplifier 230 together with the low-loss first band-pass filter 220 and arranging these in the vicinity of the antenna 20 terminal. Since the priority for the first band-pass filter 220 is to be low-loss, it is difficult to ensure sufficient out-of-band suppression. To deal with this, in the present embodiment the second band-pass filter 240 with high out-of-band suppression is added.

The third band-pass filter 310 allows only high-frequency signals related to WiFi and Bluetooth to pass through. The third band-pass filter 310 is connected to the input/output port of the RFIC 450.

Figure 2:
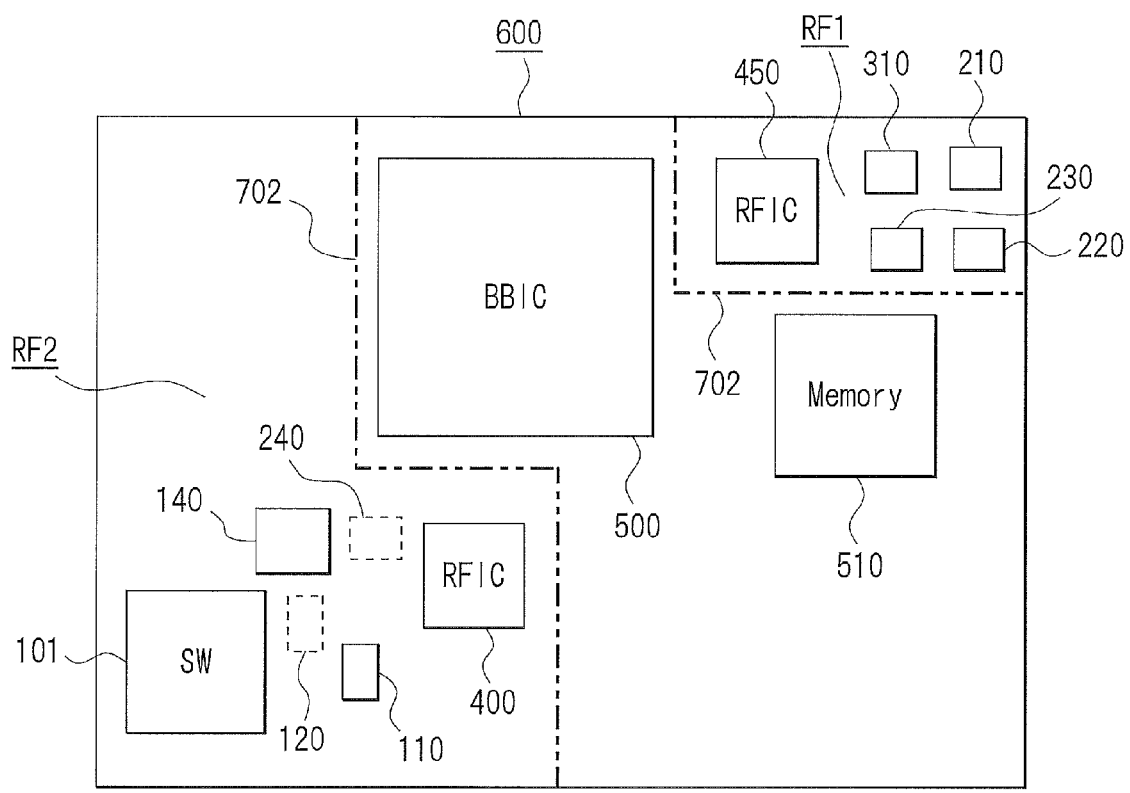
FIG. 2 is a plan view of a state in which a sealing member has been removed, as seen from the component mounting surface of the circuit module.

The circuit module 100 of the present embodiment has various types of components mounted on one main surface of a circuit substrate 600, and several components are embedded in the circuit substrate 600. The component mounting surface of the circuit substrate 600 is sealed with a sealing member such as a resin. A terminal electrode and ground electrode are formed on the other main surface of the circuit substrate 600. The circuit module 100 is used with the other main surface of the circuit substrate 600 facing the motherboard where the circuit module is to be mounted, and the terminal electrode and ground electrode are connected to the motherboard by a method such as soldering. The structure of the circuit module 100 will be explained below with reference to FIG. 2. FIG. 2 is a plan view of a state in which a sealing member has been excluded, as seen from the component mounting surface of the circuit module. Only the primary components shown in FIG. 1 are disclosed in FIG. 2.

As shown in FIG. 2, the baseband IC 500 is mounted on the substantially central upper portion of the rectangular circuit substrate 600 that is slightly longer in the horizontal direction, and the memory 510 is mounted on one side of this baseband IC 500. High-frequency components for non-mobile phone communication are mounted on a corner area RF1 (the upper right area in FIG. 2) of the circuit substrate 600 adjacent to the baseband IC and memory 510. In other words, as shown in FIG. 2, the diplexer 210, first band-pass filter 220, low-noise amplifier 230, and third band-pass filter 310, which are front end components for GPS, WiFi, and Bluetooth communication, are mounted on this area RF1 on the circuit substrate 600. The RFIC 450 used for WiFi and Bluetooth communication is also mounted on this area RF1 on the circuit substrate 600. The terminal (not shown) for connecting with the antenna 20 is formed on the bottom of the circuit substrate 600 at this area RF1.

Meanwhile, on one side of the baseband IC 500 on the circuit substrate 600, high-frequency components related to mobile phone communication are mounted on an area RF2 (the area on the left side in FIG. 2) opposite to the area RF1 where the high-frequency components for non-mobile phone communication are mounted. In other words, there is an area between the area RF1 and the area RF2 such as the baseband IC 500 where baseband signals are processed. The reason that the area RF1 and the area RF2 are separated in this manner is explained below. Usually, the antenna 20 for GPS and WiFi handled at the area RF1 and the antenna 10 for mobile phone communication handled at RF2 are arranged at a distance to each other in the casing in order to achieve sufficient isolation so that there is no mutual electromagnetic interference. The antenna 10 for mobile phone communication is arranged at the bottom of the casing, and the antenna 20 for GPS and WiFi is arranged at the top of the casing, for example. Thus, the primary reason for this configuration is that it is preferable for the processing area for signals handled at the respective antennas 10 and 20 to be mounted close to the respective antennas 10 and 20. The other reason is that the GPS reception signals and the like that are handled at the area RF1 are much weaker than the high-frequency signals related to mobile phone communication that are handled at the area RF2. In other words, leakage of high-frequency signals related to mobile phone communication will cause degradation in receiver sensitivity if electromagnetically coupled to the processing circuits for GPS reception signals and the like; therefore, this configuration is to prevent such receiver sensitivity degradation.

Specifically, as shown in FIG. 2, the RFIC 400 for mobile phone communication, and the high-frequency switch 101, first duplexer 110, second duplexer 120, and power amp IC 140, which are front end components, are mounted on the area RF2 on the left side of the circuit substrate 600. The RFIC 400, high-frequency switch 101, first duplexer 110, and power amp IC 140 are mounted on the surface of the circuit substrate 600, but the second duplexer 120 is embedded inside the circuit substrate 600. Furthermore, it should be noted that the second band-pass filter 240, which is one of the front end components related to GPS reception signals, is installed in this area RF2 in the circuit substrate 600. This second band-pass filter 240 is embedded in the circuit substrate 600. Accordingly, the distance between the second band-pass filter 240 and the low-noise amplifier 230 is greater than the distance between the second band-pass filter 240 and the RFIC 400, high-frequency switch 101, first duplexer 110, second duplexer 120, and power amp IC 140, which are front end components. That is to say, the baseband IC 500 is arranged between the second band-pass filter 240 and the low-noise amplifier 230.

The reason the second band-pass filter 240 is installed in the area RF2 instead of the area RF1 is that the processing function for high-frequency signals related to mobile phone communication and processing function for GPS reception signals are integrated into the RFIC 400. On the other hand, if the second band-pass filter 240 is arranged in the area RF2, then the leakage of high-frequency signals related to mobile phone communication, which is handled in the area RF2, electromagnetically coupling with the second band-pass filter 240 will be a problem. As a countermeasure, in the present invention the effects of signal leakage are suppressed to a minimum by embedding the second band-pass filter 240 in the circuit substrate 600.

As described later, after the various components mounted on the surface of the circuit substrate 600 are sealed with a sealing member such as a resin, grooves are formed in the sealing member that reach the surface of the circuit substrate 600 so as to demarcate the respective areas RF1 and RF2. The entire surface of the sealing member is covered with a conductive material to form a shield layer, and a conductive material is also filled into the grooves to form shield walls 702. This demarcates the respective areas RF1 and RF2. A ground electrode set at reference potential (ground potential) is formed on the surface of the circuit substrate 600 in a position corresponding to where the shield walls 702 are formed so as to be electrically connected to the shield walls 702.

Figure 3:
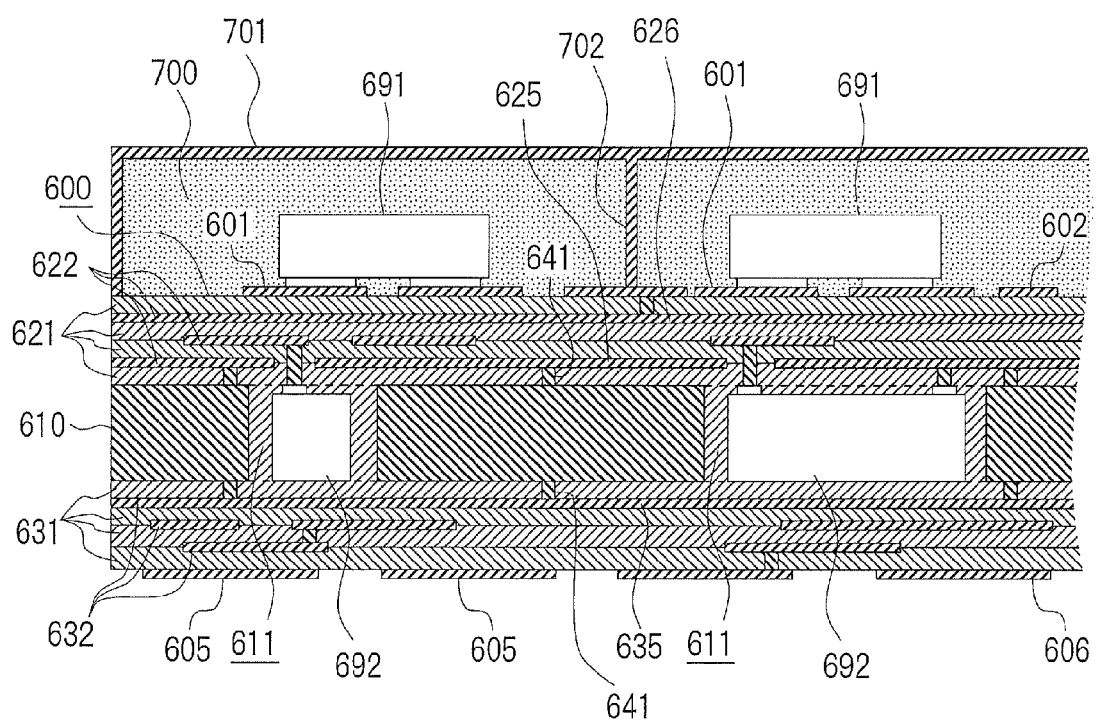
FIG. 3 is a schematic cross-sectional view of the circuit module.

Next, the structure of the circuit substrate will be explained with reference to FIG. 3. FIG. 3 is a cross-sectional view of the circuit module. The circuit substrate 600 is a multilayer substrate formed by alternately stacking insulating layers and conductive layers. As shown in FIG. 3, the circuit substrate 600 includes a core layer 610 that is a relatively thick metal conductive layer with good conductive characteristics, a plurality of insulating layers 621 and conductive layers 622 formed on one main surface (top surface) of the core layer 610, and a plurality of insulating layers 631 and conductive layers 632 formed on the other main surface (bottom surface) of the core layer 610. The insulating layers 621 and 631 and the conductive layers 622 and 632 are respectively formed on both main surfaces of the core layer 610 using the build-up method. Two of the conductive layers 622 positioned between the core layer 610 and one main surface (top surface) of the circuit substrate 600 act as ground conductive layers 625 and 626 with a reference potential (ground) applied thereto, and one layer of the conductive layers 632 between the core layer 610 and other main surface (bottom surface) of the circuit substrate 600 also acts as a ground conductive layer 635. The ground conductive layers 625 and 635 are the closest conductive layers 622 and 632 to the core layer 610, and each is connected to the core layer 610 through via conductors 641. Accordingly, the core layer 610 also functions as a ground conductor. There is also the conductive layer 622 between the two ground conductive layers 625 and 626, and the wiring line formed in this conductive layer 622 can be made to function as a strip line. Conductive lands 601 for component mounting and wiring 602 are formed on one main surface (the top surface) of the circuit substrate 600. Terminal electrodes 605 and ground electrodes 606 for connecting to a motherboard are formed on the other main surface (bottom surface) of the circuit substrate 600. Surface mounted components 691 such as the RFIC 400 are soldered to the lands 601.

Penetrating holes 611 for housing components are formed in the core layer 610. Embedded electronic components 692 including passive components such as the SAW filters, capacitor, and inductor, and active components such as the power amp IC are arranged inside the penetrating holes 611. In the present embodiment, the second duplexer 120 and second band-pass filter 240 are arranged inside the penetrating holes 611. Accordingly, it is preferable that the core layer 610 be thicker than the height of the embedded electronic components 692. In the present embodiment, the core layer 610 is made of a metal plate, or more specifically, a metal plate made of copper or a copper alloy. Spaces around the stored components in the penetrating holes 611 are filled with an insulating member such as a resin.

A sealing member 700 that seals the surface mounted components 691 is formed on the top of the circuit substrate 600, or namely, the component mounting surface. An example of the material for the sealing member 700 is an insulating resin such as an epoxy resin with silica or alumina added. The conductive shield layer 701 is formed on the surface of the sealing member 700. The shield wall 702 for demarcating the respective areas RF1 and RF2 described above is formed integrally with the shield layer 701 in the sealing member 700. The bottom end of the shield wall 702 is connected to the ground electrode on top of the circuit substrate 600.

As described above, according to the circuit module 100 of the present embodiment, the GPS reception circuit and the transceiver circuit for communication related to mobile phone networks, which are broadband wireless communication networks, are integrated in the RFIC 400, thereby serving as a configuration that is small with a high mounting density. According to the circuit module 100 of the present embodiment, the second band-pass filter 240, which is one of the front end components for GPS, is arranged in the vicinity of the front end components for mobile phone communication but is embedded in the circuit substrate 600; thus, leakage of high-frequency signals related to mobile phone communication can be prevented from electromagnetically coupling with the second band-pass filter 240. This can prevent degradation in GPS receiver sensitivity.

One embodiment of the present invention was described above, but the present invention is not limited thereto. In the embodiment above, forming the core layer 610 of copper or a copper alloy was described as an example, but there is no limitation on the material, and other metals, alloys, or resins may be used. In the embodiment described above, the surface mounted components 691 were sealed by a sealing member 700 on the top of the circuit substrate 600, but a case may be attached so as to cover the entire top surface or a portion of the top surface of the circuit substrate 600.

In the embodiment described above, the only front end component for GPS embedded in the circuit substrate 600 is the second band-pass filter 240, but another front end component may be embedded, or a plurality of front end components may be embedded. The component to be embedded may be appropriately chosen by the degree of electromagnetic coupling to leaked high-frequency signals related to mobile phone communication. In the embodiment described above, the low-noise amplifier 230 is provided as a front end component for GPS, but the low-noise amplifier 230 does not necessarily need to be provided. In this case, the first band-pass filter 220 also does not necessarily need to be provided.

In the embodiment described above, the area where baseband signals are processed such as the baseband IC 500 is arranged between the area RF1 where the high-frequency components for non-mobile phone communication are mounted and the area RF2 where the high-frequency components related to mobile phone communication are mounted, but the area RF1 and the area RF2 may be adjacent to each other, or the respective high-frequency components may be mounted on the same area.

In the embodiment described above, the first and second duplexers 110 and 120 have the respective transmission filters 112 and 122 and reception filters 114 and 124 housed in a single package, but each may use individual filters.

In the embodiment described above, the penetrating holes 611 are formed in the core layer 610 and electronic components such as the second duplexer 120 or second band-pass filter 240 are arranged therein, but recessed portions may be formed in the core layer 610 instead of the penetrating holes 611 and the respective electronic components may be arranged in these recessed portions.

In the embodiment described above, the baseband functions, which are digital signal processing functions related to the respective communications, and the various types of application functions of the mobile phone are integrated into the single baseband IC 500, but the respective functions may be mounted with separate ICs.

The frequency bands in the embodiment described above are merely examples, and the present invention can be implemented even with other frequency bands. The GPS described in the embodiment above is merely an example of a satellite positioning system, and the present invention can be implemented even with other satellite positioning systems such as Russia's GLONASS and China's Compass. In the embodiment described above, duplexers were included as examples of branching filters (antenna duplexers), but the present invention can be implemented even with a branching filter that has three or more pass frequency bands such as a triplexer.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A circuit module, comprising:
   a circuit substrate formed by stacking conductive layers and insulating layers;
   a high-frequency integrated circuit that has a reception circuit and a transceiver circuit that are mounted on a main surface of the circuit substrate, the reception circuit processing reception signals for a satellite positioning system and the transceiver circuit processing high-frequency signals for mobile phone communication;
   one or more front end components for the satellite positioning system arranged on a path of the reception signals between a satellite positioning system antenna and the high-frequency integrated circuit; and
   one or more front end components for a mobile phone arranged on a path of the high-frequency signals between a mobile phone communication antenna and the high-frequency integrated circuit,
   wherein at least one of the front end components for the mobile phone is mounted on the main surface of the circuit substrate,
   wherein at least one of the front end components for the satellite positioning system is embedded in the circuit substrate,
   wherein the one or more front end components for the satellite positioning system includes a filter that allows the reception signals for the satellite positioning system to pass through,
   wherein the filter is embedded in the circuit substrate,
   wherein the one or more front end components for the satellite positioning system includes an amplifier that amplifies the reception signals for the satellite positioning system,
   wherein the filter allows reception signals amplified by the amplifier to pass through, and
   wherein a distance between the filter and the amplifier is greater than a distance between the filter and the front end components for the mobile phone and greater than a distance between the filter and the high-frequency integrated circuit in a plan view.

2. The circuit module according to claim 1, wherein the amplifier is mounted on the main surface of the circuit substrate.

3. The circuit module according to claim 1,
   wherein the circuit substrate includes a core layer that is a conductive layer thicker than the other conductive layers and that functions as ground, and
   wherein the embedded front end component for the satellite positioning system is arranged in a recessed portion or a penetrating hole formed in the core layer.

4. The circuit module according to claim 1, wherein the filter is an acoustic wave filter.

5. A circuit module, comprising:
   a circuit substrate formed by stacking conductive layers and insulating layers;
   a high-frequency integrated circuit that has a reception circuit and a transceiver circuit that are mounted on a main surface of the circuit substrate, the reception circuit processing reception signals for a satellite positioning system and the transceiver circuit processing high-frequency signals for mobile phone communication;
   one or more front end components for the satellite positioning system arranged on a path of the reception signals between a satellite positioning system antenna and the high-frequency integrated circuit; and
   one or more front end components for a mobile phone arranged on a path of the high-frequency signals between a mobile phone communication antenna and the high-frequency integrated circuit,
   wherein at least one of the front end components for the mobile phone is mounted on the main surface of the circuit substrate,
   wherein at least one of the front end components for the satellite positioning system is embedded in the circuit substrate,
   wherein the one or more front end components for the satellite positioning system includes a filter that allows the reception signals for the satellite positioning system to pass through,
   wherein the filter is embedded in the circuit substrate,
   wherein the one or more front end components for the satellite positioning system includes an amplifier that amplifies the reception signals for the satellite positioning system,
   wherein the filter allows reception signals amplified by the amplifier to pass through, wherein a baseband processing part that processes baseband signals is mounted between the filter and the amplifier in a plan view, and
   wherein a distance between the filter and the amplifier is greater than a distance between the filter and the front end components for the mobile phone and greater than a distance between the filter and the high-frequency integrated circuit in a plan view.

6. The circuit module according to claim 5, wherein the amplifier is mounted on the main surface of the circuit substrate.

7. The circuit module according to claim 5,
   wherein the circuit substrate includes a core layer that is a conductive layer thicker than the other conductive layers and that functions as ground, and
   wherein the embedded front end component for the satellite positioning system is arranged in a recessed portion or a penetrating hole formed in the core layer.

8. The circuit module according to claim 5, wherein the filter is an acoustic wave filter.

* * * * *